United States Patent [19]

Kelly et al.

[11] 3,940,832

[45] Mar. 2, 1976

[54] STRAPPING FOR FASTENING PRODUCTION TUBING TO ELECTRICAL CABLE

[75] Inventors: Edward H. Kelly, Balboa; Ernest O. Kartinen, Long Beach, both of Calif.

[73] Assignee: Burmah Oil and Gas Company, Houston, Tex.

[22] Filed: Sept. 26, 1973

[21] Appl. No.: 400,859

[52] U.S. Cl. ............... 24/20 R; 174/47; 248/74 R
[51] Int. Cl.². B65D 63/02; F16L 3/04; H01B 7/18; H01B 17/16
[58] Field of Search .... 24/16 R, 20 CW, 20 R, 256, 24/259 C, 20 W; 166/65, 72; 174/47, 102 D, 106 D, 136, 65 R; 248/71, 74 B, 74 R

[56] References Cited
UNITED STATES PATENTS

| | | | |
|---|---|---|---|
| 1,818,625 | 8/1931 | Hunter | 248/74 R |
| 3,171,889 | 3/1965 | McCarthy | 174/47 |
| 3,235,071 | 2/1966 | Simich et al. | 24/16 R |
| 3,309,824 | 3/1967 | Barrett | 24/20 W |

*Primary Examiner*—Paul R. Gilliam
*Assistant Examiner*—Carl F. Pietruszka
*Attorney, Agent, or Firm*—Donald W. Canady

[57] ABSTRACT

A corrugated banding strap for securing an electrical cable to a tubing string for lowering into a well.

3 Claims, 4 Drawing Figures

STRAPPING FOR FASTENING PRODUCTION TUBING TO ELECTRICAL CABLE

BACKGROUND OF THE INVENTION

Down-hole oil field equipment which is electrically operated requires the use of a cable extending from the surface generating equipment through the well casing to the down-hole equipment. Armored electrical cable is employed to deliver the current to operate the down-hole equipment, for example a motor and pump. The electrically driven apparatus, such as a submersible pump, is attached to the lower end of the production tubing, i.e., the tubing string, and the entire assembly — the electrical motor, the submersible pump, and the tubing string, are lowered into the well from the surface. The electrical cable is supported by the tubing string by means of a narrow band of rolled steel which is wrapped around the tubing string and cable at approximately 10 foot intervals, and tightened to secure the cable to the tubing then sealed or locked in the tightened position by mechanically crimping the steel band or strap and holding the crimped section with a seal. The banding or strapping procedure and equipment is well known in the art.

In the past there have been numerous instances of electrical failure in the cable used in the foregoing manner, due to stretching of the cable. Stretching is on the order of about one inch per foot in some cases which is often sufficient to cause electrical failure. The cost of the cable replacement in the event of such a failure and the lost time involved in such replacement is very expensive.

Another source of electrical failure involves the snagging of the banding or strapping used to secure the cable to the tubing, on the inside edge of the casing joints at the gap between joints. Such snagging can result in tearing the strapping at the joints and damage to the cable. This problem is particularly prevalent in slant-hole operations where the tubing and cable assemblage, bear against the inside surface of the casing as the cable is lowered through the casing with the tubing.

It is an object of our present invention to provide an improved means and method for strapping the electrical cable to the production tubing for lowering into a well.

It is a further object of our present invention to provide strapping for securing an electrical cable to a tubing string for lowering into a well, which minimizes the stretching and elongation of said cable by the weight of said cable and decreases the friction on the cable while sliding downhole in contact with the inner surface of the well casing, for example in a slant hole.

It is also an object of our present invention to provide metal strapping for securing an electrical cable to a tubing string, which will not snag on the casing joint ends as said cable and tubing are lowered down through the casing.

These and other objects of our invention will become apparent from the following description of the invention and from the appended claims and the drawings.

SUMMARY OF THE INVENTION

It is proposed by our present invention to lower electrical cable into the well casing on tubing string to which the cable is secured by strapping which is corrugated in the area engaging the cable. Pre-cut lengths of the strapping are preformed to the approximate shape of the cable and longitudinally corrugated. When the strapping in accordance with our present invention, is used to secure cable to a tube string, elongation of the cable is minimized and the tendency of the strapping to snag on the casing joint edges is reduced.

DETAILED DESCRIPTION OF THE INVENTION

Figure 1:
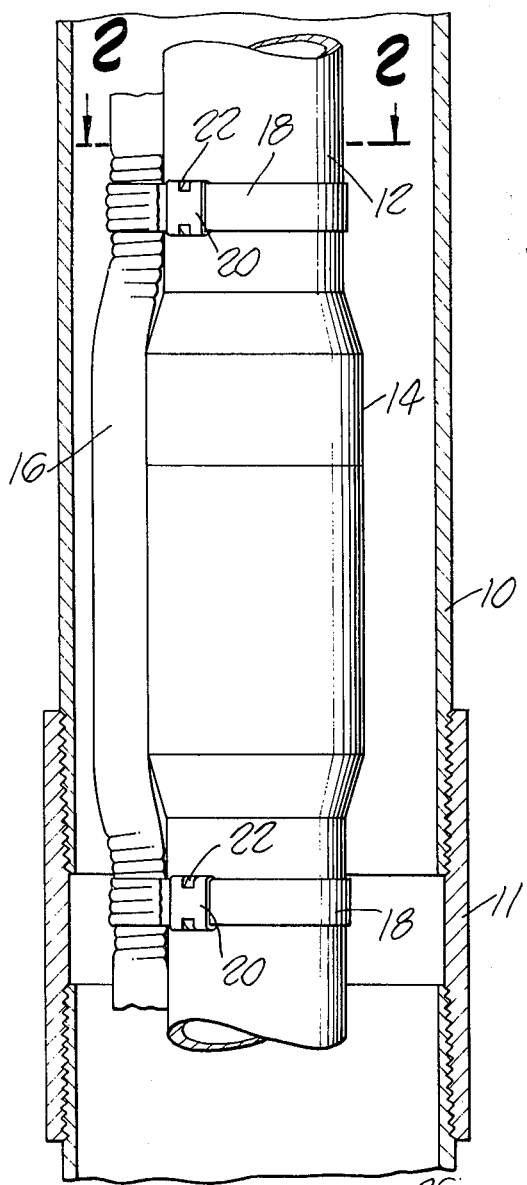
FIG. 1 shows in partial section, a cable strapped to a tubing section in accordance with the present invention, for lowering through a well casing.

Referring now to the embodiment of our invention shown in the drawings, a casing 10 extends from the earth's surface through the well bore down to the production zones. Production tubing 12 is lowered through the casing down to the production zones to receive oil being pumped to the surface. The tubing string 12 is made up of a series of lengths or joints of tubing which are joined together with couplers 14. In a similar manner the casing 10 consists of a plurality of casing lengths or joints joined end to end, to form a continuous casing from the surface down through the well. The casing joints in the casing string 10 are also joined together with the couplers 11.

To the tubing string 12 is affixed the electrical cable 16, the upper end of which is attached at the surface to the electric power supply. The cable 16 is paid out from a reel (not shown at the surface) and fastened to the tubing as consecutive joints of tubing are joined together, and lowered into the well through the casing 10.

The cable 16 is secured to the tubing string 12 with strapping members 18 which are tightened firmly to prevent relative movement between the cable 16 and the tubing 12. When a strapping member 18 has been tightened, the ends of the strapping member 18 are crimped together at 20 with a seal 22 by means of conventional sealer tool (not shown). The apparatus for tightening, crimping and sealing the strapping member is conventional equipment well known to those skilled in the art and forms no part of the present invention.

Figure 2:
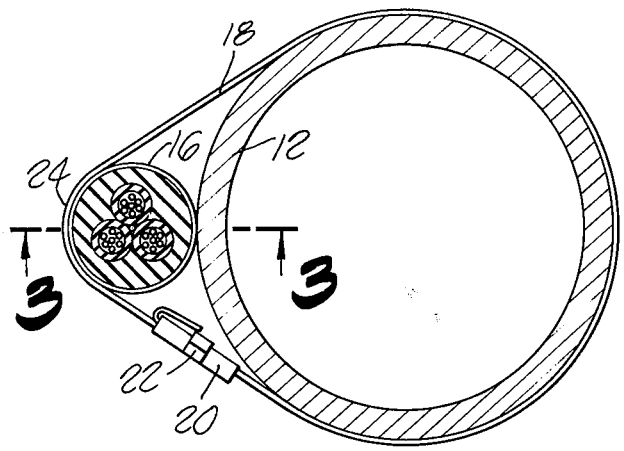
FIG. 2 is an enlarged cross-sectional view taken on line 2—2 of FIG. 1, and showing the strapping in the tightened and sealed position around the tubing string and the cable.

FIG. 2 is an enlarged cross-sectional view of the tubing string and the cable, showing the strapping member 18 and the sealing member 22. In accordance with the present invention the strapping member 18 is corrugated (longitudinally to the strapping band) so that the corrugations mate with the corrugations 24 of cable 16, as best viewed in FIGS. 3 and 4. When the strapping is tightened, the mating of the corrugations of the cable with those of the strapping prevents longitudinal movement of the cable relative to the tube string.

In the prior art it was necessary to tighten the strapping member 18 so tight that the electrical cable 16 would sometimes be deformed, which often resulted in electrical failure. With the strapping of our present invention, however, extreme tightening of the strapping band 18 is unnecessary to engage the tubing string 12 to cable 16 securely enough to prevent substantial slippage.

Figure 3:
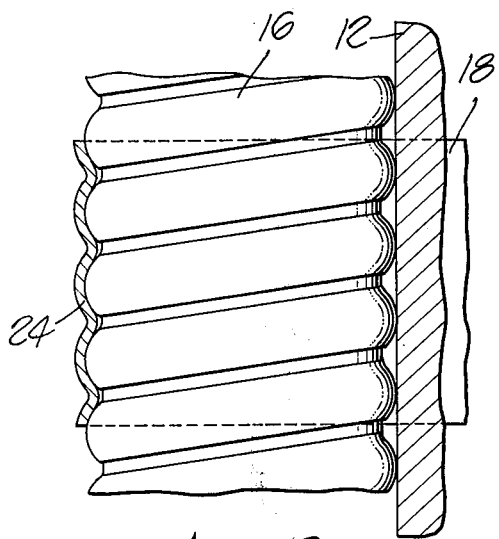
FIG. 3 is an enlarged view partially in section, taken on line 3—3 of FIG. 2, and showing the manner in which the strapping of my present invention engages the corrugated cable.
Figure 4:
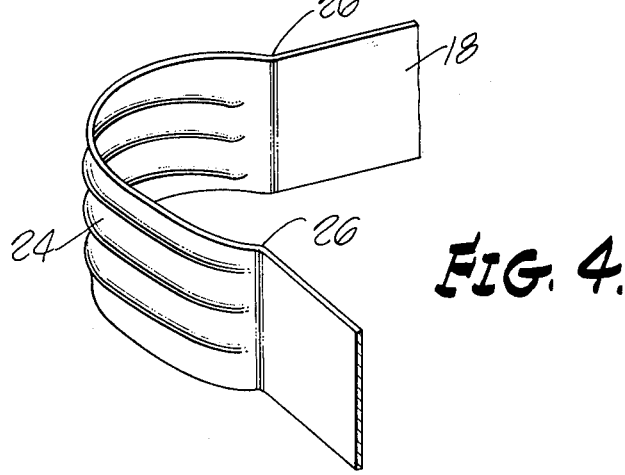
FIG. 4 shows one of the straps in accordance with our present invention which has been preformed to receive the cable and corrugated to conform to the cable exterior dimension.

FIG. 3. is an enlarged view, partially in section, taken on line 3—3 of FIG. 2. FIG. 3 shows the the manner in which the corrugations 24 formed in the banding strap 18, mate and frictionally engage the corrugations 26 of the cable 16. With the corrugated strapping, considerably more area of the strapping band is in frictional engagement with the corrugations of cable 16 to thus prevent relative movement therewith.

The strapping 18 (FIG. 4) is pre-cut to the desired length for a particular tubing and cable, and the strapping member (cut to length) is bent or pre-formed at 26 to receive the cable 16. The shape of the pre-formed strap is bent to a size slightly larger than the cable 16. The strapping 18 is then corrugated on a die to impress corrugations 24 in the strapping member. In the preferred form of our invention, the corrugating die is designed to accomplish the pre-forming operation also, so that the pre-forming and corrugating of the pre-cut strap are performed simultaneously in a single operation with a single die. Hence, with the apparatus and method of our present invention, cable strapping is provided which permits securing an electrical cable 16 to tubing string 12 so that the tubing string may be suspended from the surface of the well and the cable supported thereon, without danger of cable elongation which would result in electrical failure, deformation of the cable to effect tightening of the strapping material, or snagging of the lower edge of the strapping member on the casing joint edges.

The strapping of our present invention described above, may be used to support other elongation devices having a corrugated or rippled outer surface, to apparatus lowered into a well, for example armor-protected tubing, hydraulic lines, etc.

While our present invention has been described above with reference to a specific embodiment and with a certain degree of particularly for illustration purposes, our invention should not be limited to the details set forth, but rather should be afforded the entire scope of the appended claims.

We claim as our invention:

1. In an apparatus for running a production tubing string into a well through the well casing to which a corrugated electrical cable for providing electricity to down hole electrical apparatus positioned in said well proximate the lower end of said casing, is fastened; wherein banding strap is used to secure said cable to said tubing string at multiple points along said tubing string, and wherein said strap is tightened to firmly secure said cable to said tubing string and a seal affixed to the joined ends of said strap intermediate the tangential points of contact made by said strap with said corrugated cable and said tubing string to lock said strap in said tightened condition, the improvement comprising:

a banding strap having a section between the tangential points of contact with said cable pre-formed to a shape conforming to the shape of said cable, said pre-formed section of said strap having corrugations longitudinal to said strap to engage said corrugated cable to minimize relative movement between said strap and said cable when said cable is subjected to tensile loading.

2. A strapping device for securing a corrugated electrical cable to a string of well tubing employed to lower said cable and down hole electrical apparatus down a well through well casing, comprising:

a. a length of strapping sufficient to transversely surround both said cable and said tubing to secure said cable to said tubing;

b. a portion of said strapping having its longitudinal section pre-formed to conform to the outer circumference of said cable between the points of tangency with said cable;

c. longitudinal corrugations in said strapping at said pre-formed section of a configuration to mate the corrugations of said cable and resist movement of said cable relative to said strapping;

d. said strapping being arranged and constructed for tightening and fastening about said tubing and cable to secure said cable to said tubing whereby the weight of said cable and electrical apparatus may be borne by said tubing without substantial deformation of said cable as said strapping is tightened around said cable and said tubing, and without elongation of said cable resulting from movement of said cable relative to said strapping.

3. In an apparatus for running a tubular member from the earth's surface into a well through casing to which member a corrugated device for providing communication to down hole apparatus is fastened; wherein banding strap is used to secure said corrugated device to said tubular member at multiple points along said tubular member, and wherein said strap is tightened to firmly secure said corrugated device to said tubular member and a seal affixed to the joined ends of said strap to lock said strap in said tightened condition, the improvement comprising:

a banding strap having corrugations pre-formed longitudinal to said strap but only in that portion of said strap between its tangential points of contact with said cable, to engage said corrugated device and minimize relative movement between said strap and said corrugated device when said corrugated device is supported in said well from said surface.

* * * * *